United States Patent
Yang

(10) Patent No.: US 8,752,885 B2
(45) Date of Patent: Jun. 17, 2014

(54) RELEASABLE TUNNEL BRACE FOR A VEHICLE

(75) Inventor: Heping Yang, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/555,801

(22) Filed: Jul. 23, 2012

(65) Prior Publication Data

US 2014/0021745 A1  Jan. 23, 2014

(51) Int. Cl.
*B62D 25/20* (2006.01)
(52) U.S. Cl.
USPC .................. 296/187.08; 296/204; 296/193.07
(58) Field of Classification Search
USPC ............. 296/187.03, 187.08, 187.12, 193.07, 296/204
See application file for complete search history.

(56) References Cited

U.S. PATENT DOCUMENTS 6,367,869 B1 * 4/2002 Baccouche et al. ...... 296/187.09
2008/0007089 A1 * 1/2008 Bachmann ............... 296/187.08

* cited by examiner

*Primary Examiner* — Joseph Pape
(74) *Attorney, Agent, or Firm* — Shook Hardy & Bacon, LLP

(57) ABSTRACT

A releasable tunnel brace for releasably connecting a first side panel to a second panel of a vehicle is disclosed. One or both ends of the brace include a fastener-receiving aperture. The aperture has a round portion and an elongated slot extending therefrom. The round portion can allow the head of a shoulder bolt fastener to pass therethrough. The elongated slot is defined by a pair of opposed walls. The shoulder of the shoulder bolt fastener can pass between the opposed walls. In the event of a side impact, the brace is pushed vehicle inward and the bolt slides through the elongated slot and into the round portion where it is allowed to be released from its attachment position. The brace provides maximum torsion stiffness while withstanding only a minimum amount of lateral force before it releases and thus minimizes local deflection in the event of a side impact.

15 Claims, 5 Drawing Sheets

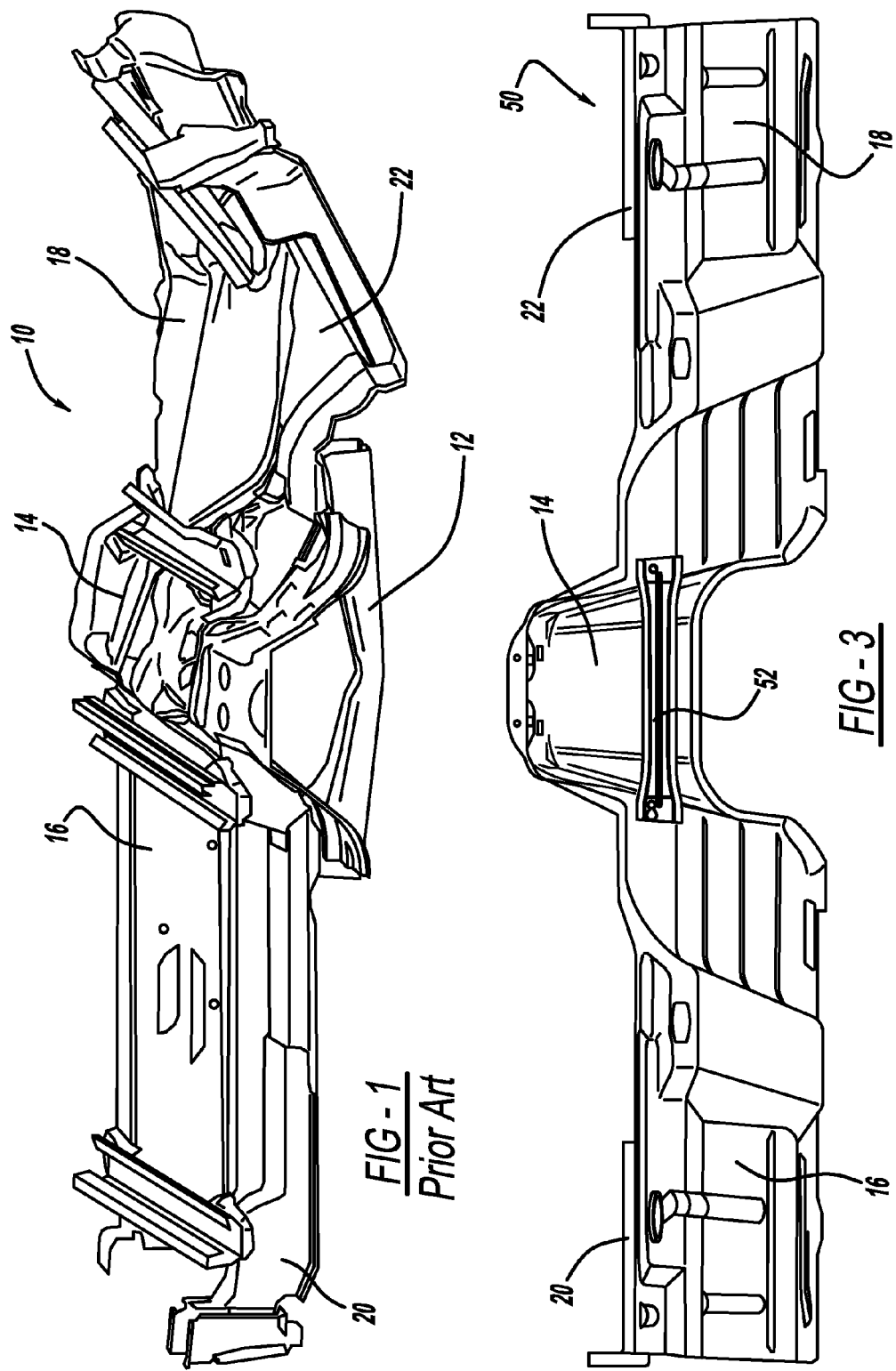

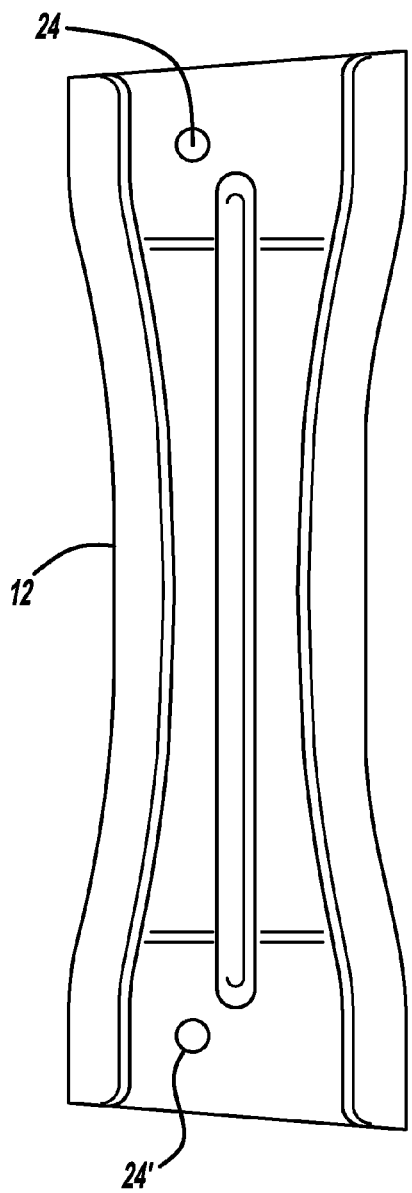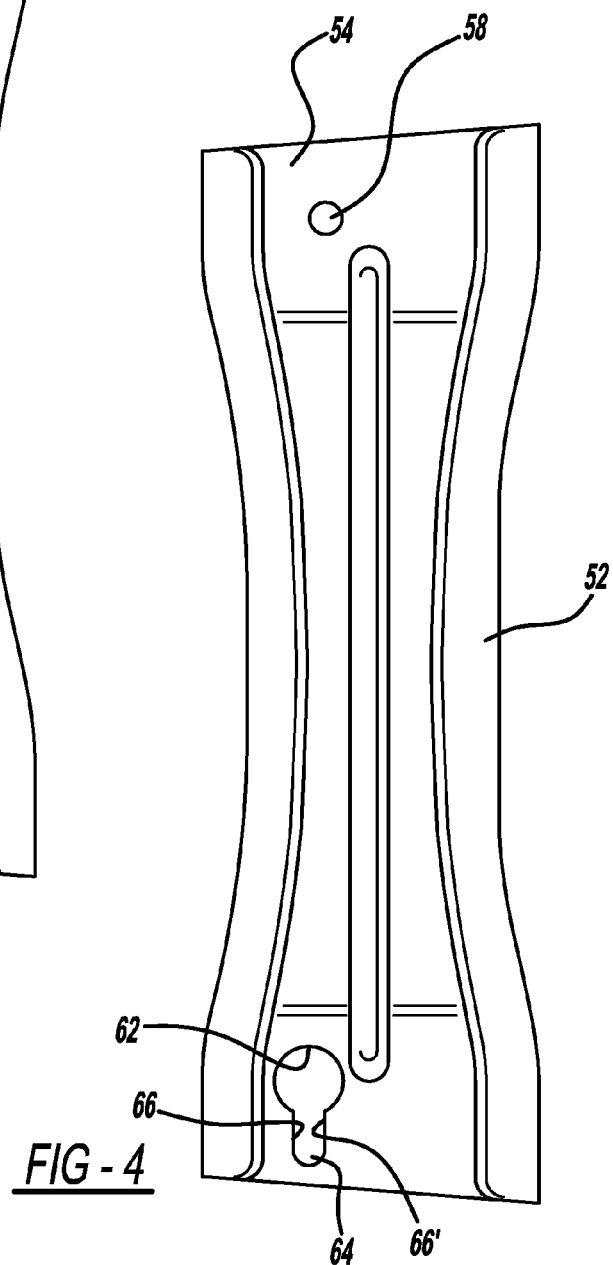

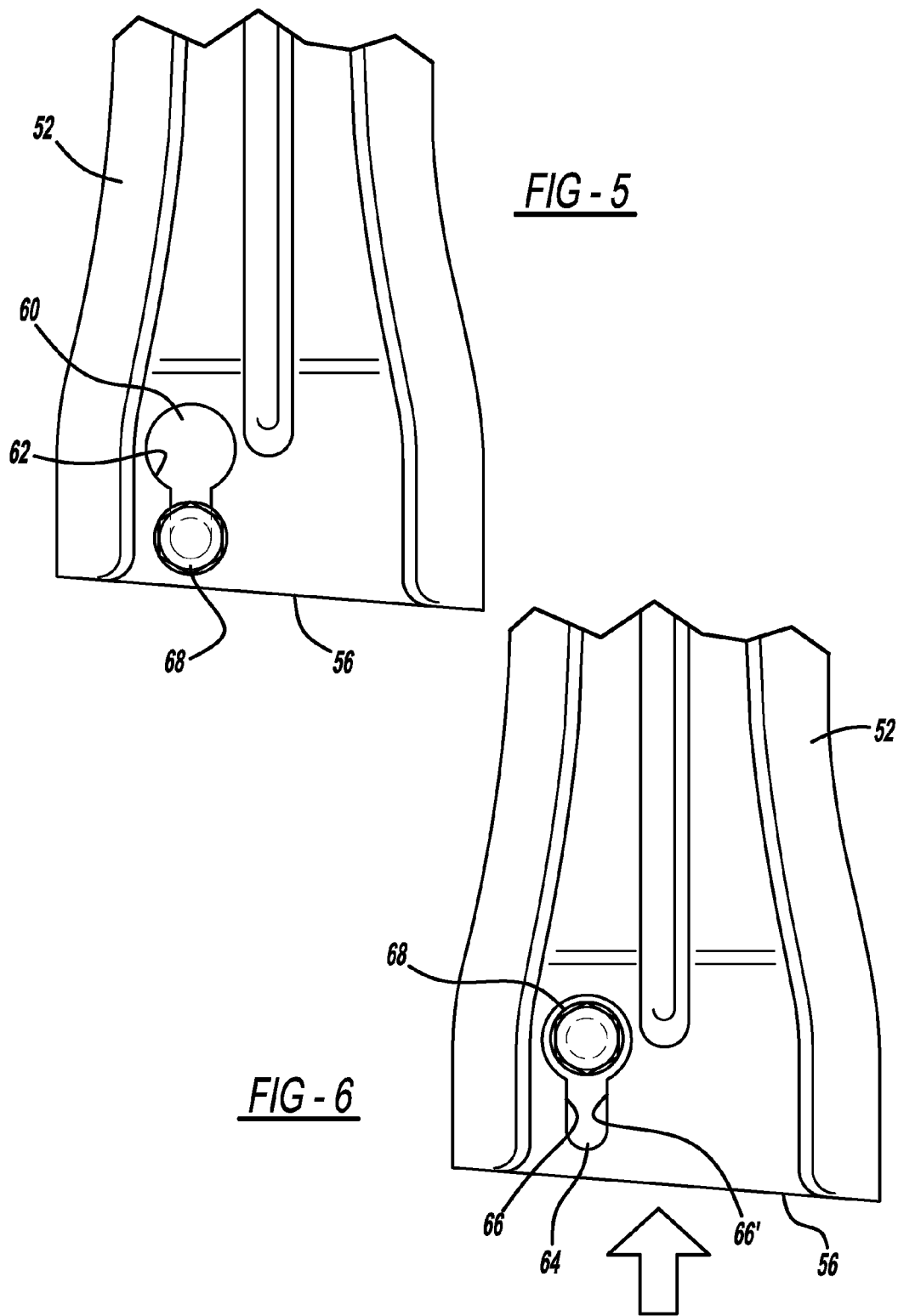

RELEASABLE TUNNEL BRACE FOR A VEHICLE

TECHNICAL FIELD

The disclosed invention relates generally to vehicle body constructions. More particularly, the disclosed invention relates to a tunnel brace that provides required torsion stiffness under normal conditions but is releasable upon side impact to reduce local deflection.

BACKGROUND OF THE INVENTION

Most types of vehicle body structures include a centrally-formed tunnel or passage that extends along the long axis of the vehicle generally from the vehicle's firewall rearward to a point behind the second set or row of seats. Various components, such as the transmission, the drive shaft (in the case of the rear wheel drive vehicle), or conduits may extend through the tunnel.

While typically being a necessary component in the modern vehicle, the tunnel unfortunately too often plays a role in the increase of one or more of noise, vibration or harshness (NVH) within the vehicle. To minimize the NVH a tunnel brace is commonly provided between the opposing floor panels adjacent the tunnel such that the tunnel brace is fitted perpendicular to the long axis of the vehicle.

A typical tunnel brace arrangement according to current design is generally illustrated as 10 in FIG. 1. The tunnel brace arrangement 10 includes a tunnel brace 12 provided to bridge the gap defined by a tunnel 14. As is known in the art, the tunnel 14 is formed between a first floor pan 16 and a second floor pan 18. The tunnel brace 12 is attached at one end to the first floor pan 16 and at the other end to the second floor pan 18. A first supporting cross-member 20 is integrally attached to the first floor pan 16 while a second supporting cross-member 22 is integrally attached to the second floor pan 18.

The tunnel brace 12 is fastened by several nut-and-bolt fasteners or by welding to the first floor pan 16 and to the second floor pan 18. FIG. 2 illustrates a bottom view of an example of a known tunnel brace 12 having two fastener holes 24, 24' for receiving conventional bolts (not shown).

The addition of the tunnel brace results in increased torsion stiffness and a consequent reduction of NVH. While generally providing a satisfactory result in the reduction of vehicle NVH, the inclusion of the tunnel brace introduces another challenge to designers which is a possible negative affect in the event of a side impact. Since the main purpose of vehicle tunnel brace is to improve vehicle torsion stiffness and thus reduce NVH, the reacting forces on the tunnel brace are vertical whereas side impact forces acting on the tunnel brace are lateral.

In the event of a side-impacting collision, local deflection of the floor pans and their supporting structures is a common result. This local deflection often translates into injury to the occupant. Referring to the prior art arrangement of FIG. 1, the impact on the tunnel brace arrangement 10 following a side impact is shown. In this figure, the second floor pan 18 has become bent and the supporting cross-member 22 has become twisted, largely because of the resilience of the tunnel brace 12 which remains generally intact. Thus the damage caused by the side impact has remained local. Injury is often transmitted to the occupant because of the localized damage. Particularly, due to the stiffness added by the conventional tunnel brace, the vehicle tunnel does not deform efficiently, thus most the deflection of vehicle occurs at the crash side. The extra local crush of vehicle structure leads to severe contact between door trim and occupants at the crash side, thus risking occupant safety.

Side impact events involving automotive vehicles typically include the imposition of dynamic loading to the vehicle body sides. The side impact event imposes severe loading on the structural members of the body. This situation is complicated by the fact that many compact or mid-sized vehicles have low rocker heights that may pass below the bumper of an impacting vehicle, resulting in high door velocities.

Generally two classes of objects that impact the vehicle side are known. The first class includes other vehicles (including other cars, trucks and other moving objects) and the second class includes poles and pole-like objects, such as telephone poles, street signs, and trees. The former class of objects is usually wider than the latter class of objects, and thus the localized damage caused by the pole or pole-like object may create greater localized damage than that caused by the vehicle.

Thus the vehicle tunnel brace may play a role in occupant injury in a side or oblique pole impact. The automotive industry is aware of this situation and has thus established standards (FMVSS 214 in the US and ECE 95 in Europe) specifying safety requirements for pole or pole-like vehicle impacts. In order to more effectively meet and exceed such requirements it is desirable to provide an alternate arrangement for the tunnel brace as is currently used.

Accordingly, as in so many areas of vehicle technology, there is room in the art of tunnel brace design for an alternative arrangement.

SUMMARY OF THE INVENTION

The disclosed invention provides a releasable tunnel brace that overcomes the limitations of known tunnel brace arrangements by providing a brace that offers robust vehicle torsion stiffness while reducing local deflection in the event of a side impact.

The tunnel of a vehicle typically is formed between two spaced apart side panels. The tunnel brace of the disclosed invention releasably connects one of the side panels with the other.

The tunnel brace of the disclosed invention includes a body having a first end and a second end. One or both of these ends includes a fastener-receiving aperture formed therein. The fastener-receiving aperture has a substantially round portion and an elongated slot. The elongated slot is parallel to the long axis of the brace and extends from the substantially round portion.

The substantially round portion of the fastener-receiving aperture is configured so as to allow the head of shoulder bolt fastener to pass therethrough. The elongated slot of the fastener-receiving aperture is defined by a pair of opposed walls. The elongated slot is configured so as to allow the shoulder of the shoulder bolt fastener to pass between the pair of opposed walls.

The tunnel brace may be attached to both the side panels by mechanical fastening or may be attached to one panel by mechanical fastening and to the other panel by a weld. As a further alternative the tunnel brace may be formed as one piece with one of the side panels.

In its ordinary position the tunnel brace of the disclosed invention provides torsion stiffness for the vehicle and is thus effective at reducing NVH. However, in the event of a side impact, the tunnel brace is pushed vehicle inward and the shoulder of the shoulder bolt fastener passes through the elongated slot and into the round portion where the head of the bolt fastener passes through the substantially rounded portion and thus the channel brace is allowed to be released from its attachment position. Thus the tunnel brace of the disclosed invention provides maximum torsion stiffness while withstanding only a minimum amount of lateral force before it releases and thus minimizes local deflection in the event of a side impact.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1 illustrates a perspective view of a tunnel brace arrangement for an automotive vehicle according to known technology;

FIG. 2 illustrates a bottom view of a tunnel brace according to known technology;

FIG. 3 illustrates a perspective underside view of an arrangement for a tunnel brace arrangement according to the disclosed invention;

FIG. 4 illustrates a bottom view of a tunnel brace according to the disclosed invention;

FIG. 5 is a close-up view of the end of the tunnel brace of FIG. 4 illustrating the elongated bolt hole;

FIG. 6 is a view similar to that of FIG. 5 but showing the position of the tunnel brace relative to the bolt following a side impact event;

DETAILED DESCRIPTION OF THE PREFERRED EMBODIMENT

Figure 7:
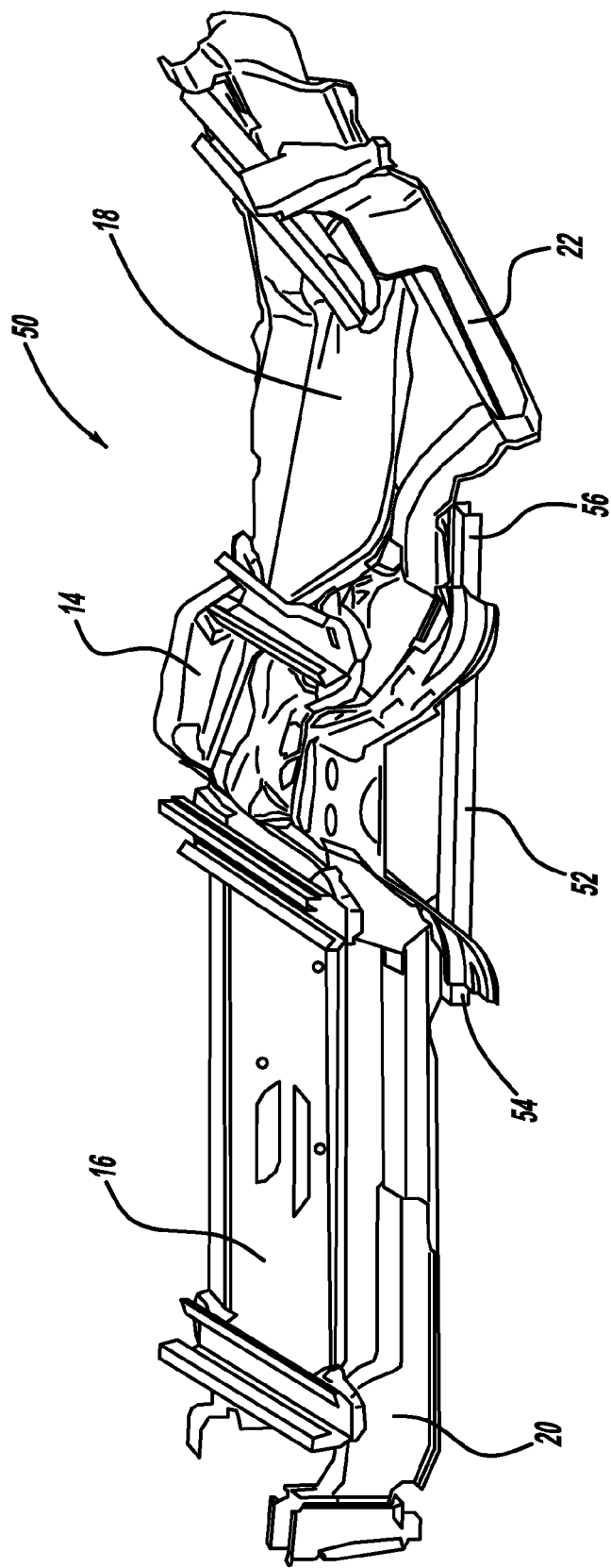
FIG. 7 illustrates a perspective view of a tunnel brace arrangement for an automotive vehicle according to the disclosed invention following a side impact event.

In the accompanying figures, the same reference numerals are used to refer to the same components. In the following description, various operating parameters and components are described for one constructed embodiment. These specific parameters and components are included as examples and are not meant to be limiting.

FIG. 3 illustrates a perspective underside view of the tunnel bridge arrangement according to the disclosed invention, generally illustrated as 50. It is to be understood that the tunnel bridge arrangement 50 as shown is only illustrative and that other variations of the arrangement are possible without deviating from the spirit and scope of the disclosed invention.

The tunnel bridge arrangement 50 includes a tunnel brace 52 according to the disclosed invention. The tunnel brace 52 extends across the vehicle tunnel 14 between the first floor pan 16 and the second floor pan 18. The tunnel brace 52 is attached at one end to one or the other of the first or second floor pans 16 and 18, respectively. Attachment of the first end of the tunnel brace 52 is made either by conventional mechanical fastening or by a weld. As a further alternative, the tunnel brace 52 may be formed integrally with one or the other of the first floor pan 16 or the second floor pan 18. As is known in the art, the first supporting cross-member 20 is integrally attached to the first floor pan 16 while the second supporting cross-member 22 is integrally attached to the second floor pan 18.

The other end of the tunnel brace 52 is attached to other of the first or second floor pans 16 and 18, respectively, in a releasable manner such that in a side impact event the releasably attached end may fall away from its bracing position. This arrangement is made possible by the tunnel brace 52 being configured so as to have at least one end that is releasably attached to the mechanical fastener.

FIGS. 4 through 6 illustrate the tunnel brace 52 according to the disclosed invention. The tunnel brace 52 includes a first end 54 and a second end 56. A conventional bolt hole 58 is formed in the first end 54. The bolt hole 58 is provided for attachment of the tunnel brace 52 to one or the other of the first or second floor pans 16 and 18. A conventional fastener such as a bolt (not shown) is preferably used for this attachment. More than one bolt hole 58 may be provided in the first end 54.

An elongated bolt hole 60 is formed at the second end 56 of the tunnel brace 52. The elongated bolt hole 60 includes a substantially round portion 62 and an elongated slot 64. The elongated slot 64 extends from the substantially round portion 62. It is possible that more than one elongated bolt hole 60 is formed in the second end 56. It is also possible that the elongated bolt hole 60 is formed at both the first end 54 and the second end 56 of the tunnel brace 52. It is to be understood that the illustrated configuration of the elongated bolt hole 60 is exemplary and some variations may be made without deviating from the spirit and scope of the invention.

The elongated slot 64 is defined by a pair of opposing walls 66 and 66'. The space defined by the opposing walls 66 and 66' is wide enough to allow for the passage of the threaded shank of the bolt fastener (not shown) to pass therebetween but is too narrow to allow for the passage therebetween of the head of the bolt fastener. However, the round portion 62 of the elongated bolt hole 60 is large enough for the head of the bolt fastener to pass therethrough. This arrangement is shown in FIG. 5.

To attach the releasable tunnel brace 52 to the vehicle the installer first attaches a shoulder bolt fastener 68 (of the type having a shank that is wider than the threaded portion thereby defining a shoulder) to, for example, the second floor pan 18. The installer next places the second end 56 of the releasable tunnel brace 52 onto the attached bolt fastener such that the head of the fastener is passed though the substantially round portion 62 of the elongated bolt hole 60. The installer then moves the releasable tunnel brace 52 so that the smooth shank of the bolt fastener passes between the two opposed walls 66 and 66' of the elongated slot 64. The attachment of the second end 56 of the tunnel brace 52 to the bolt faster 68 that is attached to the second floor pan 18 of FIGS. 3 and 7 is illustrated in FIG. 5.

The installer then uses a conventional threaded mechanical fastener, typically a bolt fastener without the shoulder described above, to attach the first end 54 of the tunnel brace 52 to the first floor pan 16. The releasable tunnel brace 52 is now in position on the vehicle.

It is to be understood that the arrangement and method of assembly described above are suggestive and are not intended as being limiting. The arrangement and method of assembly presented may be varied by using a tunnel brace that has elongated slots at both the first end 54 and the second end 56. In addition, one end of the tunnel brace may be welded to a floor pan while the other end of the tunnel brace is attached to the opposite floor pan by the elongated slot-bolt fastener arrangement described above. As a further alternative arrangement the tunnel brace may be formed as part of one or the other floor pan and may thus be an extension therefrom, being releasably attachable to the opposite floor pan by the elongated slot-bolt fastener arrangement described. Furthermore, while the tunnel brace 52 is being shown as being attached to the floor pans by only a single fastener at each of its ends 54 and 56 a greater number of fasteners may be used at one or both ends.

The behavior of the releasable tunnel brace 52 of the disclosed invention during a side impact event is generally illustrated in FIG. 7. This figure illustrates a perspective view of the tunnel brace arrangement 50 for an automotive vehicle according to the disclosed invention following a side impact event. As illustrated, the second end 56 of the tunnel brace 52 has been released from the shoulder bolt fastener 68 holding it to the second floor pan 56, thus reducing local deformation of the second floor pan 56 and, in particular, the second supporting cross-member 22.

Of course the illustrated arrangement of the floor pans and the supporting cross members is only suggestive and is set forth to show how local deformation using the releasable tunnel brace according to the disclosed invention is minimized. Other arrangements are possible.

It is to be understood that while the second end 56 of the releasable tunnel brace 52 has released from the fastener ordinarily attaching it to the second floor pan 18 it is possible that the opposite end of the releasable tunnel brace 52, the first end 54, may have been released as well from the fastener ordinarily attaching it to the first floor pan 16. As a further alternative to this arrangement and to demonstrate the flexibility and adaptability of the disclosed invention it may be possible for both the first end 54 and the second end 56 to be released from the fasteners that ordinarily keep them attached to the first floor pan 16 and the second floor pan 18, respectively.

Figure 8:
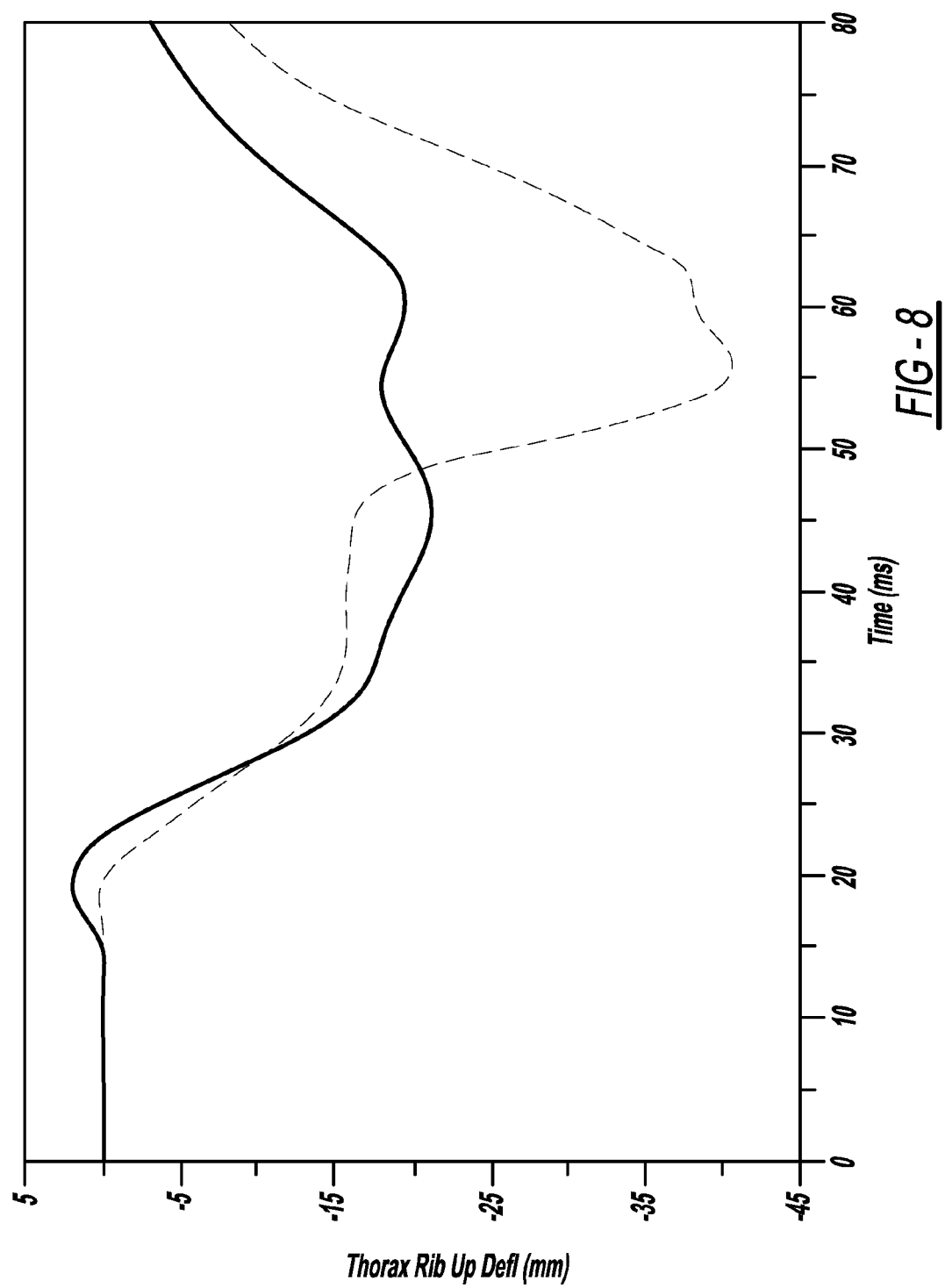
FIG. 8 is a graph illustrating the deflection of the occupant's upper thoracic cage over time comparing a side impact event involving the prior art tunnel brace arrangement with that of the disclosed invention.

Several benefits can be derived from the disclosed invention because of the significant reduction of local deformation in the event of a side impact. Perhaps the most significant of these benefits is the reduced impact experienced by the vehicle occupant in the event of a side impact. These results are illustrated in the graph of FIG. 8 and involve at least one suitable test dummy. Time (in milliseconds) is illustrated along the X-axis while the degree of deflection of the impacted occupant's upper thoracic cage (in millimeters) is illustrated along the Y-axis.

The broken line of the graph of FIG. 8 illustrates the test result in a vehicle equipped with a conventional tunnel brace as is known in the prior art. As illustrated, at about 55 milliseconds the deflection of the occupant reaches about 40 millimeters.

When the same side impact test is undertaken involving a vehicle construction involving the tunnel brace of the disclosed invention the degree of deflection of the occupant's upper thoracic cage is not as severe. Particularly, the solid line of the graph of FIG. 8 illustrates the test result in a vehicle equipped with a tunnel brace according to the disclosed design. As illustrated the most extreme deflection of the occupant's upper thoracic cage is limited to about 20 millimeters (at about 45 milliseconds), reflecting a reduction of deflection by about half when compared with the results of the prior art arrangement as set forth above.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A tunnel brace for spanning the tunnel of the floor structure of a motor vehicle, the tunnel brace comprising:
    a body having a first end and a second end; and
    a first fastener receiving aperture formed in the first end and a second fastener receiving aperture formed in the second end, the first fastener receiving aperture including a substantially round portion oriented toward the second fastener receiving aperture and an elongated slot extending from said substantially round portion and away from the second fastener receiving aperture, wherein a wall of the substantially round portion defines a portion of a circle having a diameter, wherein a pair of opposed walls of the elongated slot defines a space having a width, and wherein the diameter is larger than the width.

2. The tunnel brace of claim 1 wherein said substantially round portion of said fastener-receiving aperture is configured so as to allow the head of a bolt fastener to pass therethrough.

3. The tunnel brace of claim 2 wherein said space is wide enough to allow the shank of the bolt fastener to pass between said pair of opposed walls but is not wide enough to allow the head to pass therethrough.

4. The tunnel brace of claim 3 wherein said body of said tunnel brace has a long axis and wherein said elongated slot has a long axis, said long axis of said body of said tunnel brace and said long axis of said elongated slot being parallel.

5. The tunnel brace of claim 1 wherein said second fastener receiving aperture includes a substantially round portion oriented toward the first fastener receiving aperture and an elongated slot extending from said substantially round portion and away from the first fastener receiving aperture.

6. A tunnel brace for spanning the tunnel of the floor structure of a motor vehicle, the tunnel brace comprising:
    a body having a first fastener-receiving aperture and a second fastener-receiving aperture, wherein each of the first fastener-receiving aperture and the second fastener-receiving aperture includes a respective elongated slot that extends from a respective substantially round portion away from the other of the first fastener-receiving aperture and the second fastener-receiving aperture, wherein a wall of each respective substantially round portion defines a portion of a circle having a diameter, wherein a pair of opposed walls of the respective elongated slot defines a space having a width, and wherein the diameter is larger than the width.

7. The tunnel brace of claim 6, wherein each respective substantially round portion is configured so as to allow a head of a shoulder bolt fastener to pass therethrough.

8. The tunnel brace of claim 7 wherein said space is wide enough to allow a shoulder of said shoulder bolt fastener to pass between said pair of opposed walls but is not wide enough to allow the head to pass therethrough.

9. The tunnel brace of claim 8 wherein said body of said tunnel brace has a long axis and wherein said elongated slot has a long axis, said long axis of said body of said tunnel brace and said long axis of said elongated slot being parallel.

10. A motor vehicle having a long axis, the vehicle comprising:
    a body including a floor structure including a first side panel, a second side panel, and a tunnel formed generally between said first and second side panels and generally aligned with the long axis; and
    a tunnel brace generally connecting said first side panel to said second side panel across said tunnel, said tunnel brace including at least one fastener-receiving aperture, said at least one fastener-receiving aperture including an elongated slot that extends from a substantially round portion and that is oriented generally perpendicular to the long axis, wherein a wall of the substantially round portion defines a portion of a circle having a diameter, wherein a pair of opposed walls of the elongated slot defines a space having a width, and wherein the diameter is larger than the width.

11. The motor vehicle of claim 10 including a shoulder bolt fastener and wherein said tunnel brace includes an attachment end, said shoulder bolt fastener holding said tunnel brace to one or the other of said first panel and said second panel.

12. The motor vehicle of claim 11 wherein said substantially round portion of said fastener-receiving aperture is configured so as to allow the head of said bolt fastener to pass therethrough.

13. The motor vehicle of claim 12 wherein said space is wide enough to allow the shoulder of said bolt fastener to pass between said pair of opposed walls but is not wide enough to allow the head to pass therethrough.

14. The motor vehicle of claim 13 wherein said tunnel brace has a long axis and wherein said elongated slot has a long axis, said long axis of said tunnel brace and said long axis of said elongated slot being parallel.

15. The motor vehicle of claim 10 wherein said first side panel is a first floor panel and wherein said second side panel is a second floor panel.

\* \* \* \* \*